006
United States Patent [19]

Tada et al.

[11] Patent Number: 4,832,932
[45] Date of Patent: May 23, 1989

[54] CARBON FIBER FOR COMPOSITE MATERIAL

[75] Inventors: Hisashi Tada; Masahiro Saruta; Takashi Murata; Akira Agata; Setuo Kashiyama, all of Nagoya, Japan

[73] Assignee: Mitsubishi Rayon Co., Ltd., Tokyo, Japan

[21] Appl. No.: 93,567

[22] PCT Filed: Dec. 18, 1986

[86] PCT No.: PCT/JP86/00640

§ 371 Date: Aug. 7, 1987

§ 102(e) Date: Aug. 7, 1987

[87] PCT Pub. No.: WO87/03919

PCT Pub. Date: Jul. 2, 1987

[30] Foreign Application Priority Data

Dec. 19, 1985 [JP] Japan ................. 60-286706
Dec. 20, 1985 [JP] Japan ................. 60-287498

[51] Int. Cl.$^4$ ............................................. D01F 9/12
[52] U.S. Cl. ................... 423/447.2; 423/447.1; 423/447.4; 423/447.6; 264/29.2
[58] Field of Search ............... 423/447.1, 447.2, 447.4, 423/447.6, 460; 264/29.2

[56] References Cited

U.S. PATENT DOCUMENTS

| | | | |
|---|---|---|---|
| 3,723,607 | 3/1973 | Kalnin | 423/460 |
| 3,754,957 | 8/1973 | Druin et al. | |
| 3,772,429 | 11/1973 | Basche et al. | 423/460 |
| 3,894,884 | 7/1975 | Druin et al. | 423/447.2 |
| 3,989,802 | 11/1976 | Joe et al. | 423/447.1 |
| 4,600,572 | 7/1986 | Hiramatsu et al. | 423/447.1 |
| 4,609,540 | 9/1986 | Izumi et al. | 264/29.2 |

FOREIGN PATENT DOCUMENTS

| | | | |
|---|---|---|---|
| 0102705 | 3/1984 | European Pat. Off. | 423/447.2 |
| 117956 | 9/1984 | European Pat. Off. | 423/447.1 |
| 61-132675 | 6/1986 | Japan | 423/447.6 |
| 61-245368 | 10/1986 | Japan | 423/447.1 |
| 8501752 | 4/1985 | PCT Int'l Appl. | 264/29.2 |
| 2071702 | 9/1981 | United Kingdom | 423/447.1 |

OTHER PUBLICATIONS

Search Report for European Application 87 90 0270.

Primary Examiner—John Doll
Assistant Examiner—Robert M. Kunemund
Attorney, Agent, or Firm—Oblon, Fisher, Spivak, McClelland & Maier

[57] ABSTRACT

Oxidizing treatment of carbon fibers under specific conditions provides carbon fibers having oxygen concentration ($O_{1S}/C_{1S}$ atom number ratio) in the surface part of the carbon fibers of 0.05 to 0.30 as measured by X-ray photoelectron spectroscopy, coefficients of water-extractable fraction of up to 2.0, and coefficients of tow spread of at least $1 \times 10^{-3}$. These carbon fibers are excellent in adhesion to various matrix resins and when mixed as reinforcements with matrix resins, provide composite materials superior especially in impact resistance. The thus obtained composite materials are useful for aircraft, automobiles, and general industrial materials.

3 Claims, 2 Drawing Sheets

|—|10μ|—    X 900

|—|10μ|—    X 900

CARBON FIBER FOR COMPOSITE MATERIAL

TECHNICAL FIELD

The present invention relates to carbon fibers effective for producing carbon-fiber composite materials which are excellent in mechanical properties, particularly in compressive strength after impact. Composite materials from the present carbon fibers can be used extensively for aircraft in the first place, and automobiles and general industrial purposes.

BACKGROUND ART

Conventional carbon fibers for use in carbon-fiber composite materials, when a polyacrylonitrile-based precursor is used as starting fibers, are commonly produced by subjecting first the precursor to flame-resisting treatment in an oxidizing atmosphere at temperatures of 200° to 300° C., then carbonizing the treated fibers in an inert atmosphere, and generally subjecting the carbonized fibers to gas-phase or liquid-phase oxidation to enhance the adhesion of the carbon fibers to the matrix, followed by treating the fibers with a suitable sizing agent for the purpose of inhibiting the fiber breaking and fuzzing which may take place during handling of the fiber. However, the composite materials containing these carbon fibers are still insufficient in the adhesion of the fibers to the matrix. In particular, the compressive strength after impact (CAI) is generally on a level of $193.2 \times 10^3$ KPa (19.7 kg/mm$^2$) when the impact force is 68.1 kg/cm (1500 lb in/in), as shown in Eur. Patent Application Laid-Open No. 132853, Table IV, Example 35. Thus, it is the present situation that the CAI is extremely difficult to improve by using a matrix having such a high heat resistance as shown in Example 35 mentioned above.

While an average CAI of 45.3 ksi (31.8 kg/mm$^2$) is obtained in Eur. Patent Application Laid-Open No. 133280, Examples 6, 7, and 8, which aimed at improving the CAI, this type of composite has a tough layer called an interlief between prepreg layers and this inserted layer hinders the raise of the fiber content by volume, gives two different faces to the prepreg, and makes the handleness inferior.

On the other hand, it is required in the aircraft industry to improve the CAI to 27 kg/mm$^2$ or more in order to reduce the weight of plane bodies and it is desired to develop a composite material containing no special layer for the purpose of satisfying this requirement.

DISCLOSURE OF INVENTION

In view of such problems as noted above, the present inventors made intensive studies. As a result, it has been found that the compressive strength after impact, in spite of using the same kind of matrix resin, can be improved markedly by using carbon fibers subjected to oxidizing treatment which satisfy such specific conditions as stated below, and the present invention has been accomplished.

The substance of the invention is that the compressive strength of carbon-fiber reinforced composites after impact, in spite of using the same kind of matrix resin, can be improved markedly by using carbon fibers having the oxygen concentration ($O_{1S}/C_{1S}$ atom number ratio) in the surface part of carbon fiber is from 0.05 to 0.30 as measured by X-ray photoelectron spectroscopy, a coefficient of water-extractable fraction as is defined later is up to 2.0, preferably up to 0.5, a coefficient of tow spread as is defined later is at least $1 \times 10^{-3}$ mm/denier, and the amount of a sizing agent on the fiber is up to 0.1% by weight.

BRIEF DESCRIPTION OF DRAWINGS

The drawings referred to in the description of the invention are explained below.

1: weight; 2, 3, and 4: 50-mm$\phi$ Rolls;
5: carbon fibers in tow form

Figure 2:
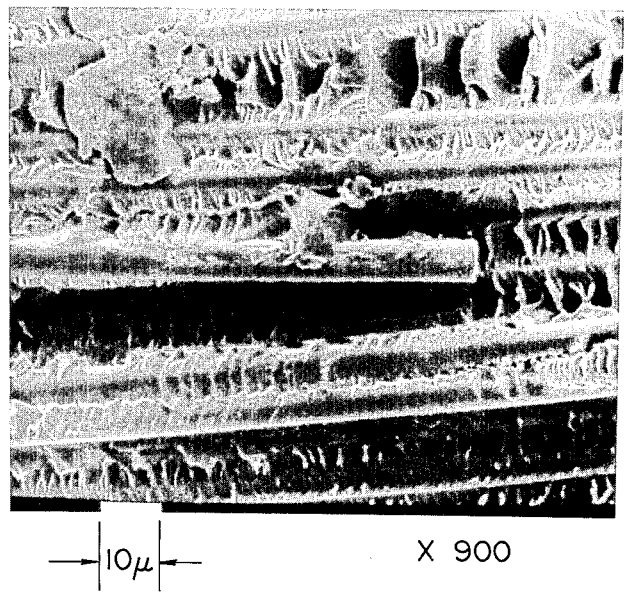
Figure 3:
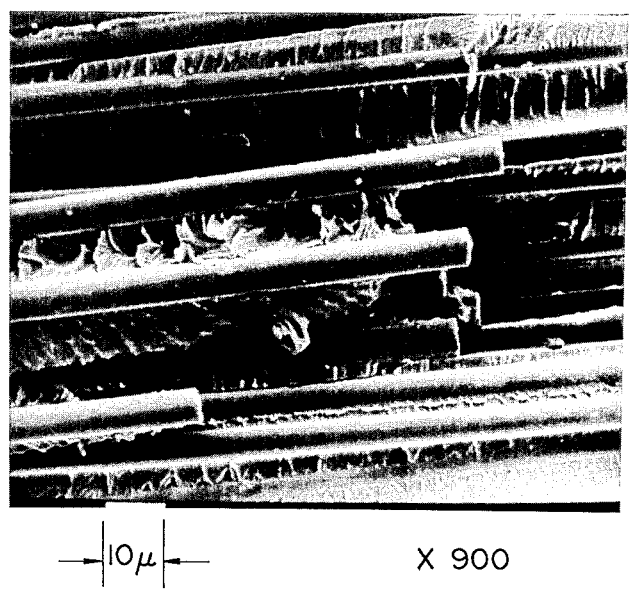

FIGS. 2 and 3 are electron microscopic photographs (each magnification factor: 900) showing cross sections of test pieces preaared in Example 1 and Comparative Example 1, respectively.

In each of FIGS. 2 and 3, a white part on the lower left side indicates a length of 10 $\mu$.

BEST MODE FOR CARRYING OUT THE INVENTION

The term "coefficient of water-extractable fraction" used herein means a 200-nm light aboorbance determined in the following way: 1 to 5 g of carbon fibers are placed in a beaker of 8 to 16 cm inner diameter containing distilled water is added in an amount of 11 times the weight of the carbon fibers. Then this beaker is placed in an ultrasonic cleaning vessel (oscillation frequency 43 kHz, high-frequency output 90 W) having internal dimensions of 298 mm (L)$\times$155 mm (W)$\times$152 mm (H) and containing water heated up to 50°$\pm$5° C., and water extractable fraction of the carbon fibers are extracted thereby for 10 minutes. The fibers are removed and the extracting water is recovered and placed in a UV cell made of quartz having a cell length of 1 cm, and fresh distilled water is placed in a reference liquid cell. The cells are scanned with UV rays of 187 to 400 nm wavelengths by using a UV spectrophotometer, and the 200-nm light absorbance of the extracting water is determined.

Figure 1:
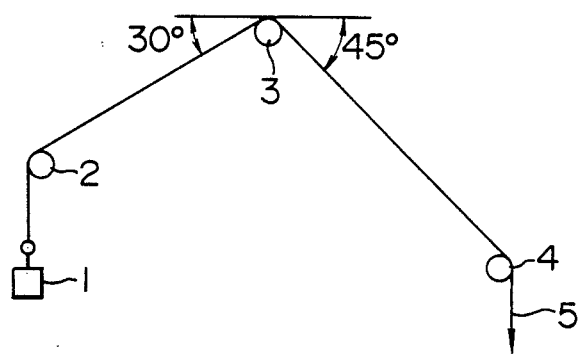
FIG. 1 illustrates the method applied to measure the coefficient of tow spread. The arrow indicates the direction of tow movement.

The coefficient of tow spread herein is a value determined by passing an untwisted tow, as shown in FIG. 1, over a 50-mm$\phi$ bar (hard chromium plated and #200 satin finished) at an access angle of 30° and a leaving angle of 45° and at a linear velocity of 1 m/min under a tension of 75 mg/denier, and measuring the width (mm) of the tow spread on the bar. The value is expressed by the width divided by the whole denier of the tow. The distance between bars 1 and 2 is 30 cm and the distance between bars 2 and 3 is 50 cm.

The object carbon fibers may be obtained from either polyacrylonitrile-based precursors or pitch type precursors and have tensile modulus of elasticity of at least 19 ton/mm$^2$, tensile strengths of at least 250 kg/mm$^2$, and elongations of at least 1.5%.

The carbon fibers of the invention need to have the oxygen concentration ($O_{1S}/C_{1S}$ atom number ratio) of 0.05 to 0.30, determined by X-ray photoelectronic spectroscopy, at the surface. When this amount is less than 0.05, the adhesion of the carbon fibers to the matrix resin is insufficient and when the amount exceeds 0.30, the fiber strength lowers; hence such amounts are undesirable. For producing carbon fibers having oxygen-containing functional groups in an amount of 0.05 to 0.30; an example of suitable methods in the case of liquid-phase treatment is to apply a positive voltage to carbon fibers in an aqueous nitric acid solution through the mediation of a metallic guide roll arranged immediately before a treatment vessel, thereby providing an electric charge of 60 to 600 coulombs per 1 g of carbon fibers between the fiber and a platinum cathode plate arranged in the treating solution; and an example of suitable methods in the case of gas-phase treatment is to treat carbon fibers in an air atmosphere containing 1 to 5% by volume ozone, at a temperature of 100° to 200° C. for a period of 1 to 5 minutes.

These surface-treated carbon fibers are immediately treated in general with a sizing agent. In this case, any sizing agent may be used provided that the relation of the sizing agent and the amount thereof is satisfied so that the coefficient of tow spread may become at least $1 \times 10^{-3}$ mm/denier. In any case, preferred sizing agents have high compatibility with the matrix. Less coefficients of tow spread than $1 \times 10^{-3}$ are undesirable since such a tow will be split insufficiently into individual discrete filaments and the adhesion of carbon fibers to the matrix resin will be impaired.

For satisfying the above-mentioned requirement, the amount of sizing agent adhering is up to 0.1%, preferably up to 0.01%, by weight.

The amount of sizing agent adhering is measured by the washing method with sulfuric acid in accordance with Japanese Industrial Standard R 7601 6.8.2, Testing Methods for Carbon Fibers.

When the amount of sizing agent adhering exceeds 0.1% by weight, the spread ability of the tow becomes worse and the filaments stick together locally and hence the penetration of the matrix resin into the sticking portions tends to be inhibited. However, the adhesion of larger amounts of sizing agent than 0.1% by weight is allowed if the tow is once split into individual discrete filaments by blowing it with hot air, passing the tow over a bar, beating the tow under tension, or combining these methods, whereby the coefficient of tow spread can be increased to a level of $1 \times 10^{-3}$ mm/denier. In view of affinity for the matrix resin, the sizing agent to be used herein is preferably bisphenol A diglycidyl ether, the reaction product thereof with bisphenol A, or such a compound represented by the formula

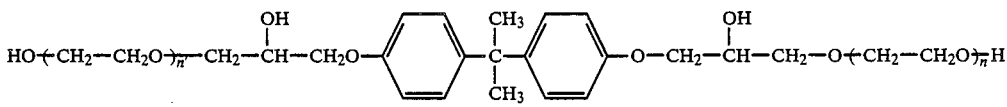

(n,n' = 1-10)

which is produced by reacting the glycidyl group of bisphenol A diglydyl ether with a polyether alcohol derived from ethylene oxide.

When the coefficient of water-extractable fraction in the invention is larger than 2.0, layers having relatively low bonding strength are present on surfaces of carbon fibers and the matrix resin is bonded to carbon fibers through these layers. Hence, it is considered that a bonding between carbon fibers and the matrix resin can be destroyed under relatively low load.

Therefore it is desirable to reduce these layers, the level of which needs to be such low as to give a coefficient of water-extractable fraction of up to 2.0. For reducing the coefficient of water-extractable fraction of carbon fibers, an effective method comprises subjecting carbon fibers produced to a surface oxidizing treatment, followed by washing them with, for example, water or aqueous solution of pH 4–12. It is effective to use ultrasonic cleaning, heating, or induction heating, during the washing.

EXAMPLES

The following examples illustrate the present invention.

The compressive strength after impact was determined in the following way:

In accordance with NASA Reference Publication 1092 (Standard tests for Toughened Resin Composites, Revised Edition), a panel having dimensions of $4'' \times 6'' \times 0.25''$ is fixed over a steel table having an opening of $3'' \times 5''$, a weight of 4.5 kg having a nose of $\frac{1}{2}''$R is dropped on the center of the panel to give an impact of 1500 lb in per 1 in of panel thickness, and then the panel is subjected to a compression test to determine the compressive strength after impact.

EXAMPLES 1–4 AND COMPARATIVE EXAMPLES 1–4

Acrylic tows each consisting of 6000 filaments of 1.5 deniers in filament size were prepared from a polymer of 0.20 in specific viscosity [ηsp] constituted of 98 wt. % of acrylonitrile, 1 wt. % of methyl acrylate, and 1 wt. % of methacrylic acid, by wet spinning using dimethylformamide as a solvent, followed by stretching the spun fibers over a hot water bath at a draw ratio of 5:1, washing with water, drying, and dry stretching at 170° C. and at a draw ratio of 1.3:1.

The degree of orientation, n, of these fibers was found to be 90.3% by X-ray diffraction.

These acrylic fibers were treated for flame-resisting by passing them for 60 minutes through a hot-air circulation type of flame-resisting furnace having a temperature profile of three stages: 220° C.–240° C.–260° C., while the fibers were 15% stretched by difference in revolution speed between rolls so far as the fiber density reached 1.22 g/cm³ and then the local shrinkage of the fibers was inhibited by equalizing the revolution speeds of rolls with which the fibers were brought into contact. Thus the flame-resisting treatment was completed.

In the next place, the flame-resisting fibers were passed for 3 minutes through a stream of pure N₂ gas in a first carbonization furnace at 600° C. while the fibers were 10% stretched. The fibers were further heat-treated under a tension of 400 mg/denier in the same atmosphere in a second carbonization furnace in which the maximum temperature was 1200° C., thereby yielding carbon fibers (I-a) having physical properties of 503 Kg/mm² in tensile strength, 24 ton/mm² in tensile modulus of elasticity, 1,790 g/cm³ in density, and 0.4 g/m in mass per unit length.

Carbon fibers obtained above were then left staying in tow form for 3 minutes in an air containing 1.8 vol % of ozone at 200° C. Then, 100-m portions of the tows were wound up separately around perforated stainless steel bobbins of 70 mm in outer diameter and immersed in boiling water at a bath ratio of 1/20 for varying periods of time, thus preparing carbon fibers (I-b) of groups exhibiting severally coefficients of water-extractable fractions of 2.5, 0.8, 0.7, and 0.5. The oxygen concentration ($O_{1S}/C_{1S}$ atom number ratio) in the surface part of these carbon fibers were from 0.15 to 0.20. Then, these groups of carbon fibers were passed through a solution of Epikote 834 (a bisphenol A type of epoxy resin made by Yuka-Shell Co., Ltd.) in methyl ethyl ketone to prepare carbon fibers (I-c) of groups to which the sizing agent adhered severally in amounts of 0.01, 0.07, 0.2, and 0.5 wt. %.

A matrix resin was prepared as was described in Example 1 of Japanese Patent Application Laid-Open No. 17289/85. Namely, 9 parts of 4,4'-diaminodiphenyl sulfone was added to 100 parts of an epoxy resin (epoxy resin (A), i.e. Epikote 828, made by Shell Chemical Co.). The mixture was placed in a heating vessel equipped with a stirrer and was polymerized with stirring at 150° C. for 4 hours. Then the mixture was discharged and spread in film form on a panel cooled with ice to stop the polymerization. To 100 parts of the obtained precondensate (B) was added 3 parts of N-(3,4-dichlorophenyl)-N',N'-dimethylurea and the mixture was stirred at 50° C. giving a pasty substance. 60 Parts of this pasty substance was mixed with 40 parts of methyl ethyl ketone to form a uniform solution. Each of the above different sorts of carbon fibers shown in Table 1 was wound up around a drum while being impregnated with this solution, and was dried and then cut open, thereby giving a prepreg in which carbon fibers were arranged unidirectionally (fiber areal weight 145 g/m², resin content 33 wt. %). Portions of each prepreg were laminated together in the quasi-isotropic state of $[+45/0/-45/90]_{4S}$, and cured at 180° C. for 2 hours, forming a composite panel. Fiber contents by volume of the thus obtained composites were as shown in Table 1. Results of measuring then the compressive strengths after impact are also shown in Table 1. It is evident from these results that high compressive strengths after impact are provided by carbon fibers having low coefficients of water-extractable fraction, high coefficients of tow spread, and small amounts of sizing agent adhering.

TABLE 1

| | Carbon fiber used | | | Formed panel | |
|---|---|---|---|---|---|
| No. | Coefficient of water-extractable fraction | Coefficient of tow spread (mm/denier) | Amount of sizing agent adhering (wt %) | Compressive strength after impact (kg/mm²) | Vf* (%) |
| Example | | | | | |
| 1 | 0.5 | $2.8 \times 10^{-3}$ | 0.01 | 28 | 60 |
| 2 | 0.8 | $2.8 \times 10^{-3}$ | 0.01 | 26 | 61 |
| 3 | 0.7 | $1.4 \times 10^{-3}$ | 0.07 | 27 | 60 |
| 4 | 0.5 | $2.8 \times 10^{-3}$ | 0.01 | 28.5 | 60 |
| Compar. Example | | | | | |
| 1 | 2.5 | $2.8 \times 10^{-3}$ | 0.01 | 24 | 61 |
| 2 | 0.5 | $0.8 \times 10^{-3}$ | 0.2 | 24 | 62 |
| 3 | 2.5 | $0.8 \times 10^{-3}$ | 0.2 | 22 | 60 |
| 4 | 0.5 | $0.4 \times 10^{-3}$ | 0.5 | 23 | 61 |

*Fiber content by volume

FIGS. 2 and 3 show electron microscopic photographs (each magnification factor: 900) of break surfaces of test specimens of Example 1 and Comparative Example 1, respectively, after tests for compressive strength after impact. It is apparent from these photographs that the adhesion between the fiber and the matrix varies greatly with the coefficient of water-extractable fraction and carbon fibers having high coefficients of water-extractable fraction exhibit weak adhesion to the matrix.

EXAMPLES 5–8 AND COMPARATIVE EXAMPLES 5–8

Results shown in Table 2 were obtained by following the procedure of Example 1 but using (i) carbon fibers provided with the oxygen concentration ($O_{1S}/C_{1S}$ atom number ratio) in the surface part of carbon fiber is from 0.18 to 0.22 by flowing an electric charge of 200 coulombs per 1 g of the fiber in 2% nitric acids to oxidize the carbon fibers anodically and then washing the carbon fibers with hot water and (ii) as a matrix resin the same composition as of Example 1 of Japanese Patent Application Laid-Open No. 215314/84.

TABLE 2

| | Carbon fiber used | | | Formed panel | |
|---|---|---|---|---|---|
| No. | Coefficient of water-extractable fraction | Coefficient of tow spread (mm/denier) | Amount of sizing agent adhering (wt %) | Compressive strength after impact (kg/mm²) | Vf* (%) |
| Example | | | | | |
| 5 | 0.5 | $2.8 \times 10^{-3}$ | 0.01 | 29 | 60 |
| 6 | 0.8 | $2.8 \times 10^{-3}$ | 0.01 | 27.5 | 60 |
| 7 | 0.7 | $1.4 \times 10^{-3}$ | 0.07 | 27 | 61 |
| 8 | 0.5 | $2.8 \times 10^{-3}$ | 0.01 | 28 | 60 |
| Compar. Example | | | | | |
| 5 | 2.5 | $2.8 \times 10^{-3}$ | 0.01 | 23 | 60 |
| 6 | 0.5 | $0.8 \times 10^{-3}$ | 0.2 | 22.5 | 62 |
| 7 | 2.5 | $0.8 \times 10^{-3}$ | 0.2 | 22 | 62 |
| 8 | 0.5 | $0.4 \times 10^{-3}$ | 0.5 | 23 | 60 |

*Fiber content by volume

EXAMPLES 9–12 AND COMPARATIVE EXAMPLES 9–12

Results shown in Table 3 were obtained by following the procedure of Example 1 but using the same composition as of Example 2 of Eur. Patent Applicatinn Laid-Open No. 133281.

TABLE 3

| | Carbon fiber used | | | Formed panel | |
|---|---|---|---|---|---|
| No. | Coefficient of water-extractable fraction | Coefficient of tow spread (mm/denier) | Amount of sizing agent adhering (wt %) | Compressive strength after impact (kg/mm²) | Vf* (%) |
| Example | | | | | |
| 9 | 0.5 | $2.8 \times 10^{-3}$ | 0.01 | 29 | 60 |
| 10 | 0.8 | $2.8 \times 10^{-3}$ | 0.01 | 28 | 60 |
| 11 | 0.7 | $1.4 \times 10^{-3}$ | 0.07 | 27.5 | 61 |
| 12 | 0.5 | $2.8 \times 10^{-3}$ | 0.01 | 28 | 61 |
| Compar. Example | | | | | |
| 9 | 2.5 | $2.8 \times 10^{-3}$ | 0.01 | 22 | 60 |
| 10 | 0.5 | $0.8 \times 10^{-3}$ | 0.2 | 23 | 60 |
| 11 | 2.5 | $0.8 \times 10^{-3}$ | 0.2 | 22 | 61 |

TABLE 3-continued

| No. | Carbon fiber used | | | Formed panel | |
|---|---|---|---|---|---|
| | Coefficient of water-extractable fraction | Coefficient of tow spread (mm/denier) | Amount of sizing agent adhering (wt %) | Compressive strength after impact (kg/mm²) | Vf* (%) |
| 12 | 0.5 | $0.4 \times 10^{-3}$ | 0.5 | 21 | 62 |

*Fiber content by volume

COMPARATIVE EXAMPLE 13

Portions of carbon fibers (I-a) prepared in Example 1 were subjected in tow form to oxidizing treatment by causing them to stay severally for 0.5 and 8 minutes in a 200° C. air containing 1.8 vol % of ozone, and were treated with boiling water in the same manner as in Example 1 to give a coefficient of water-extractable fraction of 0.5. In this case, the respective oxygen concentration ($O_{1S}/C_{1S}$ atom number ratio) in the surface part of carbon fibers is 0.03 and 0.4. Then, 0.01 wt % of the same sizing agent as used in Example 1 was caused to adhere, and composites were prepared in the same manner as in Example 1. The respective compressive strengths after impact were found to be 18 kg/mm² (Vf 61%) and 25 kg/mm² (Vf 60%). It is evident therefrom that sufficient performance cannot be obtained when the amount of oxygen concentration ($O_{1S}/C_{1S}$ atom number ratio) in the surface of carbon fibers is too small. It also can be seen that the performance is lowered when this amount is too large.

EXAMPLES 13-16 AND COMPARATIVE EXAMPLES 14-17

Carbon fibers (I-a) having physical properties of 458 kg/m² in tensile strength, 30.2 ton/mm² in tensile modulus of elasticity, 1.770 g/cm² in density, and 0.39 g/m in mass per unit length were prepared according to the procedure of Example 1 except that the maximum atmospheric temperature of the carbonizing conditions in the second carbonization furnace was changed to 1800° C. These carbon fibers were anodically oxidized by flowing an electric charge of 250 coulombs per 1 g of the fiber in a 5% aqueous solution of ammonium hydrogencarbonate, and were washed with hot water, providing carbon fibers having 0.2 to 0.21 ($O_{1S}/C_{1S}$) of oxygen concentration ($O_{1S}/C_{1S}$ atom number ratio) in the surface part of the carbon fibers. Results shown in Table 4 were obtained therefrom by following the procedure of Example 1 but using the same composition as of Example 2 of Japanese Patent Application Laid-Open No 58424/85.

TABLE 4

| No. | Carbon fiber used | | | Formed panel | |
|---|---|---|---|---|---|
| | Coefficient of water-extractable fraction | Coefficient of tow spread (mm/denier) | Amount of sizing agent adhering (wt %) | Compressive strength after impact (kg/mm²) | Vf* (%) |
| Example | | | | | |
| 13 | 0.5 | $2.8 \times 10^{-3}$ | 0.01 | 30 | 60 |
| 14 | 0.8 | $2.8 \times 10^{-3}$ | 0.01 | 27.5 | 61 |
| 15 | 0.7 | $1.4 \times 10^{-3}$ | 0.07 | 27 | 61 |
| 16 | 0.5 | $2.8 \times 10^{-3}$ | 0.01 | 29 | 60 |
| Compar. Example | | | | | |
| 14 | 2.5 | $2.8 \times 10^{-3}$ | 0.01 | 21 | 61 |
| 15 | 0.5 | $0.8 \times 10^{-3}$ | 0.2 | 22 | 60 |
| 16 | 2.5 | $0.8 \times 10^{-3}$ | 0.2 | 20 | 60 |
| 17 | 0.5 | $0.4 \times 10^{-3}$ | 0.5 | 21 | 61 |

*Fiber content by volume

EXAMPLE 17 AND COMPARATIVE EXAMPLE 18

Composites were prepared from the same respective carbon fibers as used in Example 1 and Comparative Example 1, by following the respective procedures of Example 1 and Comparative Example 1 except that the carbon fibers were impregnated with a matrix resin shown in Example 35 of Eur. Patent Application Laid-Open No. 132853. The composites were measured for compressive strength after impact. Results of the measurement were as shown in Table 5.

TABLE 5

| No. | Carbon fiber used | | | Formed panel | |
|---|---|---|---|---|---|
| | Coefficient of water-extractable fraction | Coefficient of tow spread (mm/denier) | Amount of sizing agent adhering (wt %) | Compressive strength after impact (kg/mm²) | Vf* (%) |
| Example 17 | 0.5 | $2.8 \times 10^{-3}$ | 0.01 | 29 | 61 |
| Compar. Example 18 | 2.5 | $2.8 \times 10^{-3}$ | 0.01 | 21 | 59 |

*Fiber content by volume.

INDUSTRIAL APPLICABILITY

The carbon fibers of the present invention, having excellent properties, that is to say, the amount of oxygen concentration ($O_{1S}/C_{1S}$ atom number ratio) in the surface part of the carbon fibers is from 0.05 to 0.3 as measured by X-ray photoelectron spectroscopy, the coefficient of water-extractable fraction is up to 2.0, and the coefficient of tow spread is at least $1 \times 10^{-3}$ mm/denier, are best suited as reinforcements for addition to various matrix resins. Because of being superior especially in compressive strength after impact, composite materials comprising matrix resins reinforced with carbon fibers of the invention are useful for aircraft, automobiles, and general industrial materials.

We claim:

1. Carbon fibers which are obtained by flame-resisting treating of acrylic fiber and then carbonizing at a temperature of 1000° C. or more, and thereafter treating the resulting carbon fiber with an oxidation treatment in liquid or gas phase in one step, for composite materials excellent in impact resistance, characterized in that the oxygen concentration ($O_{1S}/C_{1S}$ atom numer ratio) in the surface part of said carbon fibers is from 0.05 to 0.2 as measured by X-ray photoelectron spectroscopy, the coefficient of water-extractable fraction is up to 2.0, and the coefficient of tow spread is at least $1 \times 10^{-3}$ mm/denier.

2. The carbon fibers of claim 1, wherein the amount of a sizing agent adhering onto the fiber is up to 0.1% by weight.

3. The carbon fibers of claim 1, characterized by having tensile strengths of 250 kg/mm², tensile modulus of elasticity of at least 19 ton/mm2, and elongations of at least 1.5%.

* * * * *